(12) United States Patent
Bahng et al.

(10) Patent No.: US 6,285,717 B1
(45) Date of Patent: Sep. 4, 2001

(54) DIGITAL VIDEO ENCODER FOR DIGITAL VIDEO SYSTEM

(75) Inventors: Sam-yong Bahng; Jung-chul Kim, both of Bucheon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 08/864,565

(22) Filed: May 29, 1997

(30) Foreign Application Priority Data

Jun. 5, 1996 (KR) .................................................. 96/20034

(51) Int. Cl.[7] .............................. H04N 7/12; H04N 5/21
(52) U.S. Cl. ...................................... 375/240.29; 348/608
(58) Field of Search ........................ 375/240.29, 240.27, 375/240.26; 348/470, 500, 554, 557, 575, 607, 608, 609

(56) References Cited

U.S. PATENT DOCUMENTS

| 4,037,248 | * | 7/1977 | Iijima et al. | 348/392 |
| 4,646,138 | * | 2/1987 | Willis | 348/621 |
| 5,021,873 | * | 6/1991 | Abumi | 348/560 |

(List continued on next page.)

FOREIGN PATENT DOCUMENTS

| 36314299A | * | 6/1988 | (JP) | H04N/11/00 |
| 363260291A | * | 10/1988 | (JP) | H04N/11/20 |

OTHER PUBLICATIONS

Green, R.J., "Noise Evaluation of Emerging Television System", International Broadcasting Convention, 1995, IEEE.*

Cho et al., "Design of a digital filter with variable characteristics for luminance signal processing of DTVs", 1996 IEEE TENCON.*

Teichner, D., "PAL encoding and decoding with improved luminance/chrominance separation", IEE 1988 International Conference on Consumer Electronics.*

Primary Examiner—Vu Le
(74) Attorney, Agent, or Firm—Marger Johnson & McCollom, P.C.

(57) ABSTRACT

A digital video encoder for a digital video system wherein digital video data output from an MPEG decoder is input and an analogue composite video baseband signal (CVBS) is output comprises first selection means for selectively outputting first and second clocks in response to a first selection signal, signal dividing means for dividing the input digital video data into a luminance signal and a chrominance signal in response to the output of the first selection means, luminance signal processing means for regulating the gain and offset of the luminance signal, adding a synchronizing signal to the regulated luminance signal, and filtering a low band component of the luminance signal to output the filtered signal as a digital luminance signal, chrominance signal processing means for regulating the gain of the chrominance signal, interpolating the gain-regulated chrominance signal, producing color difference signals, interpolating the produced color difference signals, filtering a low band component of the interpolated color difference signals, and modulating the filtered color difference signals, to thereby output the modulated signal as a digital chrominance signal, signal synthesizing means for synthesizing the digital luminance and chrominance signals and outputting the synthesized signal, first digital-to-analogue converting means for converting the synthesized signal to an analogue signal and outputting the converted signal as the analogue composite video baseband signal, and controlling means for outputting the first selection signal corresponding to the size and input speed of the input digital video signal. Therefore, synchronization is easy, costs are reduced, various OSD functions are provided, a high-quality image is provided, and the displayed image is undistorted.

11 Claims, 2 Drawing Sheets

U.S. PATENT DOCUMENTS

| | | | |
|---|---|---|---|
| 5,025,312 | * | 6/1991 | Faroudja .............................. 348/620 |
| 5,285,470 | * | 2/1994 | Schreiber ............................. 348/723 |
| 5,430,487 | * | 7/1995 | Naimpally ........................... 348/429 |
| 5,488,481 | * | 1/1996 | Okada et al. ........................ 348/501 |
| 5,532,837 | * | 7/1996 | Ootaka et al. ....................... 386/112 |
| 5,638,135 | * | 6/1997 | Mukai .................................. 348/642 |

* cited by examiner

DIGITAL VIDEO ENCODER FOR DIGITAL VIDEO SYSTEM

BACKGROUND OF THE INVENTION

The present invention relates to a digital video system such as a multi media system, a digital video, a digital video disk (DVD), a video-CD, a digital VCR, a digital television, a camcorder and a video editor, and more particularly, to a digital video encoder in a digital video system.

A digital video decoder in a digital video system reads compressed data from a storage medium and decodes it to thus output a decoded digital video signal. In a digital video encoder, the decoded digital video signal is input, and divided into chrominance and luminance signals. The divided signals are converted to an analogue composite video baseband signal (CVBS) in response to a clock, a vertical synchronizing signal, a horizontal synchronizing signal, and a field signal. This CVBS has analogue video data and is transmitted to a display device such as a CRT.

In a conventional digital video encoder of a digital video system, a main clock is generated from a signal having 4fsc (Here, fsc is 3.58 MHz in NTSC or 4.43 MHz in PAL). Thus, according to the data communication regulation CCIR (International Radio Consultative Committee) 601 or 656, a standard data sampling clock frequency used in the conventional digital video encoder should be 27 MHz or 13.5 MHz. Thus, when using the conventional digital video encoder, input digital video data is not synchronized with the main clock and thus the data can be damaged.

In particular, when the digital data compressed according to an MPEG standard is restored and displayed, a blocking phenomenon can be generated due to a nonlinear feature of data according to the connection between scanning lines.

Also, when compressing the data using the MPEG standard, a high-frequency data component is removed so that a gentle noise, that is, mosquito noise is generated on a display screen when reproducing the compressed data.

Furthermore, since a chip for an on screen display (OSD) and a chip serving as a digital video encoder are separately provided in the prior art, a clock corresponding to each chip should be separately generated and various financial and spacial problems occur when connecting one chip to the other in the case of requesting an OSD and a digital video encoder simultaneously.

SUMMARY OF THE INVENTION

To solve the above problems, it is an object of the present invention to provide a digital video encoder for a digital video system wherein digital video data compressed using an MPEG standard is synchronized with one of the main clocks using two main clocks.

It is another object of the present invention to provide a digital video encoder for a digital video system wherein a mosquito noise and a blocking phenomenon are not generated.

It is still another object of the present invention to provide a digital video encoder for a digital video system having an on screen display function.

To accomplish the first object, there is provided a digital video encoder for a digital video system wherein the encoder receives digital video data output from an MPEG decoder and outputs an analogue composite video baseband signal, comprising: first selection means for selectively outputting first and second clocks in response to a first selection signal; signal dividing means for dividing the input digital video data into a luminance signal and a chrominance signal in response to the output of the first selection means; luminance signal processing means for regulating the gain and offset of the luminance signal, adding a synchronizing signal to the regulated luminance signal, and filtering a low band component of the luminance signal to output the filtered signal as a digital luminance signal; chrominance signal processing means for regulating the gain of the chrominance signal, interpolating the gain-regulated chrominance signal, producing color difference signals, interpolating the produced color difference signals, filtering a low band component of the interpolated color difference signals, and modulating the filtered color difference signals, to thereby output the modulated signal as a digital chrominance signal; signal synthesizing means for synthesizing the digital luminance and chrominance signals and outputting the synthesized signal; first digital-to-analogue converting means for converting the synthesized signal to an analogue signal and outputting the converted signal as the analogue composite video baseband signal; and controlling means for outputting the first selection signal corresponding to the size and input speed of the input digital video signal.

To accomplish the second object, it is preferable that the digital video encoder for a digital video system further comprises: line information storage means for receiving the luminance and chrominance signals output from the signal dividing means and storing line information of the respective signals; line comparing means for comparing the line information stored in the line information storage means with currently-input line information and outputting the compared result; and line information producing means for producing new line information according to the compared result and outputting the new line information as the luminance and chrominance signals to the luminance and chrominance signal processing means, respectively.

To accomplish the third object, it is preferable that the digital video encoder for a digital video system further comprises on-screen display means for outputting luminance and chrominance components of stored data to be displayed on screen and mapping data corresponding to a mapping address input from the controlling means to the luminance and chrominance processing means, respectively.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
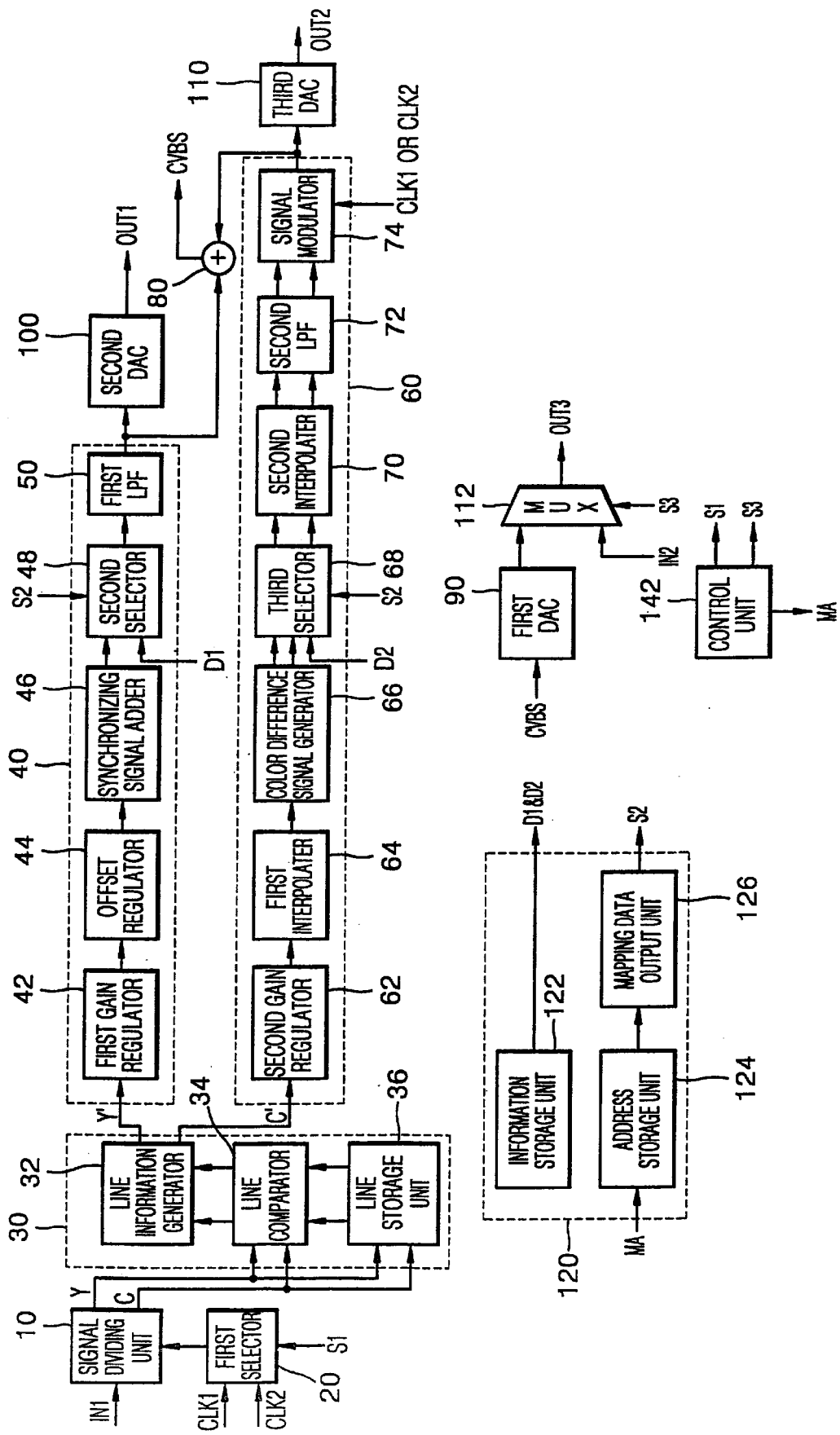
FIG. 1 is a block diagram of a digital video encoder according to the present invention.

Referring to FIG. 1, a digital video encoder according to the present invention is constituted of: a signal dividing unit 10; a first selector 20; a noise removing unit 30 including a line information generator 32, a line comparator 34, and a line storage unit 36; a chrominance signal processing unit 40 including a first gain regulator 42, an offset regulator 44, a synchronizing signal adder 46, a second selector 48, and a first low pass filter (LPF) 50; a luminance signal processing unit 60 including a second gain regulator 62, a first interpolator 64, a color difference signal generator 66, a third selector 68, a second interpolator 70, a second LPF 72, and a signal modulator 74; first, second, and third DACs (Digital to Analogue Converter) 90, 100, and 110, respectively; a multiplexer 112; an on screen display unit 120 including an information storage unit 122, an address storage unit 124, and a mapping data output unit 126; a control unit 142; and an adder 80.

The signal dividing unit 10 receives a signal output from an MPEG (Moving Picture Exert Group)1 or MPEG 2 decoder of a digital video system through an input terminal INI, divides the input video signal into a digital luminance signal Y and a chrominance signal C in response to first or second clocks CLK1 or CLK2, and then outputs the divided signals. At this time, the data input to the signal dividing unit 10 is a 16-bit signal in a CCIR 601, and an 8-bit signal in a CCIR 656. Thus, the first selector 20 receives the first clock CLK1 having a 27 MHz frequency and the second clock CLK2 having a 13.5 MHz frequency, selects one of the clocks responding to a selection signal S1 output from the control unit 142 depending on the size and input speed of a digital video signal and then outputs the selected clock to the signal dividing unit 10. That is, the first selector 20 selects and outputs the 13.5 MHz first clock when the 16-bit data is input to the signal dividing unit 10 and selects and outputs the 27 MHz second clock when the 8-bit data is input thereto.

Meanwhile, the noise removing unit 30 removes a blocking phenomenon and mosquito noise. Here, the line storage unit 36 stores line information on 1H ("H" is a horizontal synchronizing signal) of the digital luminance signal and digital chrominance signal output from the signal dividing unit 10, respectively. The line comparator 34 compares previous line information stored in the line storage unit 36 with current line information directly input from the signal dividing unit 10 and then outputs the compared results to the line information generator 32.

The line information generator 32 produces new line information depending on the compared result and outputs the new line information as a digital luminance signal Y' and a digital chrominance signal C' to the luminance and chrominance signal processing units 40 and 60, respectively. In the end, since the luminance and chrominance signals pass through the noise removing unit 30, a line-to-line edge image gets smoothly straightened and noise is removed.

The first gain regulator 42 receives the digital luminance signal Y' output from the line information generator 32, multiplies the input digital luminance signal Y' by a gain which is determined by the number of input bits of the second or third DAC 100 or 110 or that which is required by the system, and outputs the multiplied digital luminance signal Y'. The offset regulator 44 adds to the signal input from the first gain regulator 42 an offset which reflects a synchronizing signal level of the luminance signal and then outputs the resultant signal. That is, the first gain regulator 42 and offset regulator 44 convert a level of the luminance signal Y' to an NTSC or PAL level. The synchronizing signal adder 46 adds a synchronizing signal to the offset regulated signal and outputs the resultant signal to the second selector 48.

Meanwhile, the second gain regulator 62 in the chrominance signal processing unit 60 receives the digital chrominance signal C' output from the line information generator 32, multiplies the input signal by a predetermined gain, and outputs the resultant signal. The first interpolator 64 interpolates the signal output from the second gain regulator 62 and outputs the interpolated signal to the color difference signal generator 66. The color difference signal generator 66 receives the output signal of the first interpolator 62, generates color difference signals Cr and Cb, and then outputs the color difference signals to the third selector 68.

Meanwhile, the address storage unit 124 in the on-screen-display unit 120 receives and stores a mapping address MA output from the control unit 142. The mapping data output unit 126 stores mapping data S2 and outputs the mapping data S2 corresponding to the mapping address as a control signal of the second and third selectors 48 and 68. The information storage unit 122 stores information D1 and D2 which respectively correspond to luminance and color components of a on-screen-display letter and outputs the stored information to the second and third selectors 48 and 68, respectively.

The second selector 48 receives the output of the synchronizing signal adder 46 and the information D1 corresponding to the luminance component of an on-screen-display letter and selectively outputs one of the received signals to the first LPF 50 in response to the mapping data S2. The first LPF 50 receives and interpolates the digital luminance signal and limits a signal component of a predetermined high-frequency band. The second DAC 100 receives the digital luminance signal, the low-pass component of which is filtered in the first LPF 50, converts it into an analogue luminance signal, and then outputs the converted signal through an output terminal OUT1.

Similarly, the third selector 68 receives the color difference signals and the information D2 corresponding to the color component of an on-screen-display letter and selectively outputs one of the received signals to the second interpolator 70 in response to the mapping data S2. The signal output from the third selector 68 is interpolated by the second interpolator 70 and filtered by the second LPF 72. The signal modulator 74 receives the digital color difference signals Cr and Cb output from the second LPF 72 and modulates and synthesizes the input color difference signals using the first and second clocks CLK1 and LK2 according to the NTSC or PAL. The third DAC 110 converts the synthesized digital color difference signal into an analogue signal and outputs the converted signal through an output terminal OUT2.

Meanwhile, the signals output from the first LPF 50 and the signal modulator 74 are added in the adder 80, output to the first DAC 90 as a composite video baseband signal, converted to an analogue signal therein. The multiplexer 112 receives the analogue signal output from the first DAC 110 and an external video signal through an input terminal IN2 and selectively outputs one of the received signal through an output terminal OUT3 in response to a selection signal S3 output from the control unit 142. That is, the digital video encoder according to the present invention outputs the analogue luminance and chrominance signals simultaneously, thereby supporting a super digital video system.

Figure 2:
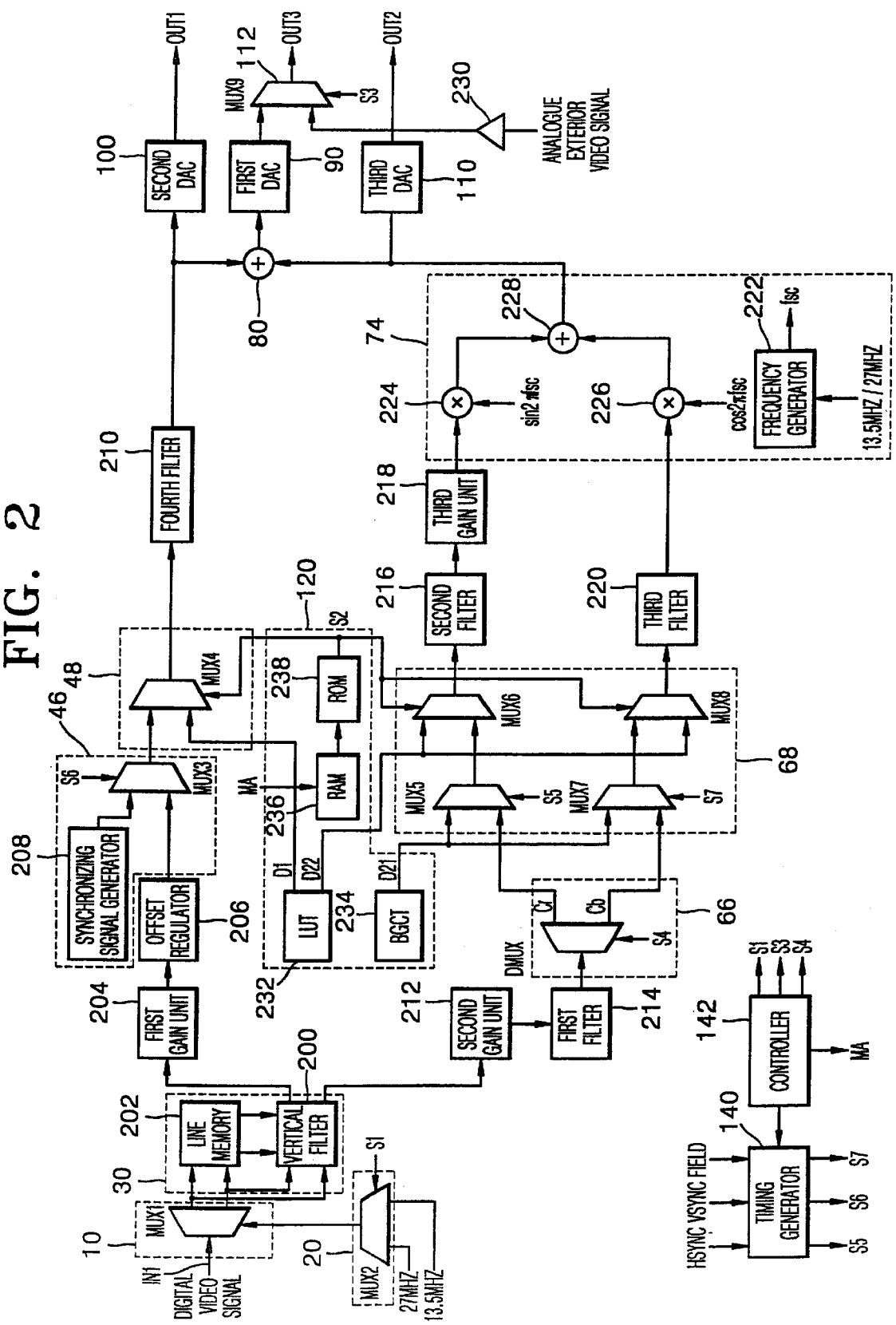
FIG. 2 is a block diagram of the digital video encoder shown in FIG. 1 according to a preferred embodiment of the present invention.

The digital video encoder shown in FIG. 2 is constituted by first to ninth multiplexers MUX1–MUX9, a demultiplexer 66, a line memory 202, a vertical filter 200 for performing the functions of the line comparator 34 and line information generator 32 shown in FIG. 1, a first gain unit 204, an offset regulator 206, a synchronizing signal generator 208, a look up table (LUT) 232, a background color table (BGCI) 234, a RAM 236, a ROM 238, a second gain unit 212, first to fourth filters 214, 216, 220 and 210 for performing the function of interpolation, a third gain unit 218, a buffer 230, and two multipliers 224 and 226, an adder 228 together with a frequency generator 222 which constitute a signal modulator 74.

The MUX1 of FIG. 2 receives a digital video signal through an input terminal IN1, separates the input signal in response to a clock output from the MUX2 into luminance and chrominance signals, and outputs the separated signals. The line memory 202 performs a function corresponding to the line storage unit 36 (in FIG. 1). The vertical filter 200 functioning as the line comparator 34 and line information generator 32 (in FIG. 1) receives the luminance and chrominance signals stored in the line memory 202 and the luminance and chrominance signals output from the MUX1, filters the input signals, and outputs the filtered luminance and chrominance signals to the first and second gain units 204 and 212, respectively. The offset regulator 206 performs the same function as that of the offset regulator 44 of FIG. 1.

Meanwhile, the chrominance signal input to the second gain unit 212 is 8-bit data having a sampling speed of 13.5 MHz. Here, since the chrominance signal is sequentially input at the speed of 13.5 MHz, the actual data speed of each color difference signal Cr and Cb thereof is 6.25 MHz. The digital chrominance signal having its gain regulated in the second gain unit 212 is input to the first filter 214 and programmed so that three bandwidths can be selected. The chrominance signal having passed through the first filter 214 is input to the DMUX 66 and divided into the color difference signals Cr and Cb which are output to the MUX5 and MUX7, respectively. The MUX5 receives a background screen color D21 stored in the BGCT 234 and the color difference signal Cr and selectively outputs one of the received signals to the MUX6 in response to a control signal S5. The MUX7 receives a background screen color D21 stored in the BGCT 234 and the color difference signal Cb and selectively outputs one of the received signals to the MUX8 in response to a control signal S7.

A timing generator 140 receives horizontal and vertical synchronizing signals HSYNC and VSYNC and a field signal FIELD and outputs control signals S5, S6 and S7 under the control of the control unit 142.

The on-screen-display unit 120 allows a desired letter and the position thereof to be programmed on a display screen under the control of the control unit 142. Accordingly, the RAM 236 inputs and stores a mapping address MA output from the control unit 142. The ROM 238 outputs a corresponding mapping data stored therein in response to the mapping address. The LUT 232 stores information D22 and D1 corresponding to the color and luminance of a letter to be displayed on an on-screen-display (OSD). The MUX6 receives the output of the MUX5 and the chrominance information D22 stored in the LUT 232 and selectively outputs the input data to the second filter 216 in response to the control signal output from ROM 238. likewise, the MUX8 receives the output of the MUX7 and the chrominance information D22 stored in the LUT 232 and selectively outputs the input data to the third filter 220, in response to mapping data S2 output from the ROM 238.

The second and third filters 216 and 220 interpolate data having the sampling speed of 13.5 MHz to data having the sampling speed of 27 MHz. That is, the low components of the color difference signals Cr and Cb having the 13.5 MHz sampling speed output from the MUX6 and MUX8, respectively, are filtered in the second and third filters 216 and 220.

That is, the signals having the 13.5 MHz sampling speed are converted to signals having the 27 MHz sampling speed to heighten an image resolution.

The first multiplier 224 multiplies the color difference signal Cr, having been multiplied by a predetermined gain in the third gain unit 218, by sin2πfsc and outputs the result to the adder 228. The second multiplier 226 multiplies the color difference signal Cb, output from the third filter 220, by cos2πfsc and outputs the result to the adder 228. The adder 228 adds the outputs of the first and second multipliers 224 and 226 and outputs the result as a color signal to the adder 80 and the third DAC 110.

The frequency generator 222 receives a first clock (13.5 MHz) or a second clock (27 MHz) and outputs a signal having a corresponding sub-carrier frequency (fsc) according to the NTSC and PAL. That is, the frequency generator 222 outputs a signal having a 3.58 MHz sub-carrier frequency in the NTSC and 4.43 MHz in the PAL. The digital luminance and chrominance signals added in the adder 80 are converted to an analogue CVBS signal in the first DAC 90, input to the MUX9 together with an external analogue video signal input through a buffer 230. The MUX9 selectively outputs one of the input signals through an output terminal OUT3 in response to a control signal S3.

That is, the digital video encoder according to the present invention simultaneously provides the analogue luminance and chrominance signals together with the CVBS signal so that it can be used in a super digital video system.

Meanwhile, in a synchronizing signal adding unit 46, a synchronizing signal output from the synchronizing signal generator 208 and the offset-regulated digital luminance signal output from the offset regulator 206 are input to the MUX3. Then, the MUX3 selectively outputs one of the input signals thereof in response to a control signal S6 whose delay with respect to an original synchronizing signal for a predetermined period of time is compensated for and which is the synchronizing signal of a video signal. That is, the MUX3 outputs to the MUX4 the signal output from the synchronizing signal generator 208 during a synchronizing period and outputs to the MUX4 the digital luminance signal having a regulated offset during other periods of time in response to a control signal S6. The MUX4 receives the output of the MUX3 and the luminance information DI output from the LUT 232 and selectively outputs one of the input signals thereof to the fourth filter 210 in response to with the mapping data S2 output from the ROM 238. Here, the fourth filter 210 interpolates a luminance component and limits a predetermined frequency band component. The second DAC 100 receives the output of the fourth filter 210, converts the received signal to an analogue signal, and outputs the converted analogue luminance signal through the output terminal OUT1.

Meanwhile, the noise removing unit 30 of FIG. 1 can optionally operate under the control of the control unit 142.

As described above, the digital video encoder for a digital video system according to the present invention has following advantages. First, since a digital video signal is modulated to generate a composite video baseband signal using a single clock, synchronization is easily accomplished. Second, the digital video encoder performs an onscreen-display function, manufacturing costs are reduced and letters can be displayed on a screen in various colors. Third, since the mosquito noise is removed in the digital video encoder, a high-quality image is produced. Fourth, since a blocking phenomenon between lines of a video signal is prevented, the displayed image is undistorted.

What is claimed is:

1. A digital video encoder for a digital video system receiving uncompressed digital video data, the encoder comprising:

a control unit for outputting a first selection signal corresponding to the size and input speed of the digital video data;

a first selector for selectively outputting one of a first and second clock in response to the first selection signal;

a signal dividing circuit for dividing the digital video data into a digital luminance signal and a digital chrominance signal in response to the output of the first selector;

a luminance signal processing circuit for conditioning the digital luminance signal from the signal dividing circuit;

a chrominance signal processing circuit for conditioning the digital chrominance signal from the signal dividing circuit;

a converter circuit for combining the conditioned digital luminance signal and chrominance signal and converting the combined digital signal into an analog composite video baseband signal; and a noise removing circuit for removing noise from the digital luminance and digital chrominance signals.

2. A digital video encoder for a digital video system receiving uncompressed digital video data, the encoder comprising:

a control unit for outputting a first selection signal corresponding to the size and input speed of the digital video data;

a first selector for selectively outputting one of a first and second clock in response to the first selection signal;

a signal dividing circuit for dividing the digital video data into a digital luminance signal and a digital chrominance signal in response to the output of the first selector;

a luminance signal processing circuit for conditioning the digital luminance signal from the signal dividing circuit;

a chrominance signal processing circuit for conditioning the digital chrominance signal from the signal dividing circuit; and a converter circuit for combining the conditioned digital luminance signal and chrominance signal and converting the combined digital signal into an analog composite video baseband signal;

wherein the luminance signal processing circuit comprises:

a gain regulator for regulating the gain of the luminance signal from the signal dividing circuit;

an offset regulator for regulating a voltage offset of the gain-regulated luminance signal;

a synchronizing signal adder for adding a synchronizing signal to the offset regulated luminance signal; and a luminance low-pass filter for filtering a low band component of the luminance signal from the synchronizing signal added luminance signal.

3. A digital video encoder for a digital video system receiving uncompressed digital video data the encoder comprising:

a control unit for outputting a first selection signal corresponding to the size and input speed of the digital video data;

a first selector for selectively outputting one of a first and second clock in response to the first selection signal;

a signal dividing circuit for dividing the digital video data into a digital luminance signal and a digital chrominance signal in response to the output of the first selector;

a luminance signal processing circuit for conditioning the digital luminance signal from the signal dividing circuit;

a chrominance signal processing circuit for conditioning the digital chrominance signal from the signal dividing circuit; and a converter circuit for combining the conditioned digital luminance signal and chrominance signal and converting the combined digital signal into an analog composite video baseband signal;

wherein the chrominance signal processing circuit comprises:

a gain regulator for regulating the gain of the chrominance signal from the signal dividing circuit;

a first interpolator for interpolating the gain-regulated chrominance signal;

a color difference signal generator for producing color difference signals from the interpolated chrominance signal;

a second interpolator for interpolating the color difference signals;

a chrominance low-pass filter for filtering a low band component from the interpolated color difference signals; and a signal modulator receiving and modulating the filtered chrominance.

4. A digital video encoder for a digital video system receiving uncompressed digital video data the encoder comprising:

a control unit for outputting a first selection signal corresponding to the size and input speed of the digital video data;

a first selector for selectively outputting one of a first and second clock in response to the first selection signal;

a signal dividing circuit for dividing the digital video data into a digital luminance signal and a digital chrominance signal in response to the output of the first selector;

a luminance signal processing circuit for conditioning the digital luminance signal from the signal dividing circuit;

a chrominance signal processing circuit for conditioning the digital chrominance signal from the signal dividing circuit; and a converter circuit for combining the conditioned digital luminance signal and chrominance signal and converting the combined digital signal into an analog composite video baseband signal;

wherein the chrominance signal processing circuit comprises:

a gain regulator for regulating the gain of the chrominance signal from the signal dividing circuit;

a first interpolator for interpolating the gain-regulated chrominance signal;

a color difference signal generator for producing color difference signals from the interpolated chrominance signal;

a second interpolator for interpolating the color difference signals;

a low-pass filter for filtering a low band component from the interpolated color difference signals; and a signal modulator modulating the filtered digital chrominance signal.

5. A digital video encoder according to claim 4 including:
a digital-to-analog converter for converting the digital luminance signal output from the luminance signal processing circuit to an analog signal; and
a chrominance digital-to-analog converter for converting the digital chrominance signal output from the chrominance signal processing circuit to an analog signal.

6. A digital video encoder according to claim 4 wherein the chrominance signal processing circuit includes a selector coupled between the color difference signal generator and the second interpolator for selectively outputting the stored data to be displayed on screen and the color difference signals in response to the mapping data.

7. A digital video encoder for a digital video system receiving uncompressed digital video data, the encoder comprising:
a control unit for outputting a first selection signal corresponding to the size and input speed of the digital video data;
a first selector for selectively outputting one of a first and second clock in response to the first selection signal;
a signal dividing circuit for dividing the digital video data into a digital luminance signal and a digital chrominance signal in response to the output of the first selector;
a luminance signal processing circuit for conditioning the digital luminance signal from the signal dividing circuit;
a chrominance signal processing circuit for conditioning the digital chrominance signal from the signal dividing circuit;
a converter circuit for combining the conditioned digital luminance signal and chrominance signal and converting the combined digital signal into an analog composite video baseband signal;
a line storage unit for receiving and storing the luminance signal and chrominance signals output from the signal dividing circuit;
a line comparator for comparing the line information stored in the line information storage unit with currently-input line information and outputting a compared result; and
a line information generator for producing new line information according to the compared result and outputting the new line information as the luminance signal to the luminance signal processing circuit and the chrominance signal to the chrominance signal processing circuit.

8. A digital video encoder for a digital video system receiving uncompressed digital video data, the encoder comprising:
a control unit for outputting a first selection signal corresponding to the size and input speed of the digital video data;
a first selector for selectively outputting one of a first and second clock in response to the first selection signal;
a signal dividing circuit for dividing the digital video data into a digital luminance signal and a digital chrominance signal in response to the output of the first selector;
a luminance signal processing circuit for conditioning the digital luminance signal from the signal dividing circuit;
a chrominance signal processing circuit for conditioning the digital chrominance signal from the signal dividing circuit;
a converter circuit for combining the conditioned digital luminance signal and chrominance signal and converting the combined digital signal into an analog composite video baseband signal; and
an on-screen display unit for outputting luminance and chrominance components of stored data displayed on a screen and outputting mapping data corresponding to a mapping address to the luminance and chrominance signal processing circuits.

9. A digital video encoder according to claim 8 wherein the luminance signal processing circuit includes a selector for selectively outputting the stored data to be displayed on screen and the luminance signal in response to the mapping data and a low pass filter coupled to the output of the selector.

10. A digital video encoder according to claim 8 wherein the on-screen display unit includes:
an information storing unit for storing the luminance and chrominance components of the stored data to be displayed on screen;
an address storage unit for storing the mapping address; and
a mapping data output unit for outputting the stored mapping data to the luminance and chrominance signal processing circuits in response to the mapping address.

11. A method for generating an analog composite video baseband signal from digital video data, comprising:
generating a first selection signal corresponding to the size and input speed of the digital video data;
selecting between a first or second clock in response to the first selection signal;
dividing the digital video data into a luminance signal and a chrominance signal in response to the selected clock;
removing noise from the luminance and chrominance signals;
synthesizing the luminance and chrominance signals into digital luminance and chrominance signals; and
combining the synthesized signal into a composite video baseband signal; and
converting the combined signal into the analog composite video baseband signal.

* * * * *

UNITED STATES PATENT AND TRADEMARK OFFICE
CERTIFICATE OF CORRECTION

PATENT NO. : 6,285,717 B1
DATED : September 4, 2001
INVENTOR(S) : Bahng et al.

It is certified that error appears in the above-identified patent and that said Letters Patent is hereby corrected as shown below:

Title page,
Under References "36314299A" should read -- 363142997A --.

Column 3,
Line 11, "INI" should read -- IN1 --.

Column 4,
Line 39, "LK2" should read -- CLK2 --.
Line 64, "(BGCI)" should read -- (BGCT) --.

Column 6,
Line 3, "sin2πsc" should read -- sin2πfsc --.

Signed and Sealed this

Thirtieth Day of April, 2002

*Attest:*

JAMES E. ROGAN
*Attesting Officer*     *Director of the United States Patent and Trademark Office*